United States Patent [19]
Phillips

[11] 4,235,421
[45] Nov. 25, 1980

[54] LOAD MOVING APPARATUS

[76] Inventor: Aretee J. Phillips, 121 W. Houstonia, Royal Oak, Mich. 48073

[21] Appl. No.: 18,991

[22] Filed: Mar. 9, 1979

[51] Int. Cl.[3] .................... C02F 5/02

[52] U.S. Cl. .................... 254/386; 134/172; 239/186; 74/110

[58] Field of Search .................... 254/175.5; 239/186, 239/187; 134/172; 189/20

[56] References Cited

U.S. PATENT DOCUMENTS 3,088,545 5/1963 Meyer .................... 254/175.5 X
3,266,729 8/1968 Baskett .................... 239/186
3,620,188 11/1971 Schmitzer .................... 239/186 X
3,908,907 9/1975 Beltran .................... 239/186

*Primary Examiner*—Edward J. McCarthy
*Attorney, Agent, or Firm*—Fisher, Gerhardt, Crampton & Groh

[57] ABSTRACT

A load moving apparatus in which a linear actuator is used to move a load through an arrangement of cables and pulleys, so that the load is moved through a distance and at a speed which is a multiple of the distance of movement of the linear actuator.

12 Claims, 6 Drawing Figures

LOAD MOVING APPARATUS

This invention relates to reciprocating load moving equipment of the type used to move paint spray equipment in a reciprocating path or move sliding gates or the like between open and closed positions.

Reciprocating load moving apparatus typically uses linear actuators such as hydraulic or air operated cylinder type actuators. Such equipment, however, frequently requires excessive linear space to obtain the required amount of load movement. In a simple arrangement when using a conventional cylinder type actuator containing a piston and a rod attached to one side of the piston, the minimum amount of linear space required is the overall length of the actuator plus the length of stroke of the rod in addition to any other mechanism required to link the actuator to the load. In most such cases, the linear space required for the actuator is at least twice that of the resultant movement of the load. This is particularly undesirable when the load must be reciprocated in a path of substantial length as may be the case with sliding gates.

It is an object of the invention to provide apparatus for reciprocating a device in a linear path which is longer than the linear space required for a linear actuator producing such movement.

Another object of the invention is to provide a reciprocating load moving apparatus in which the load is moved through a path a distance and at a speed which is larger than and is a multiple of the distance and speed of movement of the linear actuator.

Still another object of the invention is to provide a load reciprocating apparatus which is particular useful in moving devices such as paint spray guns. A further object of the invention is to provide a reciprocating load moving apparatus having particular utility for moving sliding gates.

Yet another object of the invention is to provide a load moving apparatus which reciprocates the load in opposite directions at a uniform speed.

The objects of the invention are accomplished by a load moving apparatus in which a carriage member is moved by a linear actuator. The carriage member is provided with a pair of pulleys and a pair of flexible elements such as cables having one end fixed to a support and the other end affixed to a load member which is to be moved. The cables are guided over the pulleys on the support member so that movement of the actuator in one direction serves to move the load in one direction at a speed through a distance which is a multiple of the distance of movement of the actuator. Movement of the load member in the opposite direction is accomplished by a duplicate set of cables and pulleys. The actuator is so constructed and arranged that the effective area of a piston within the actuator is twice as large at one side as at the other side. The actuator is supplied continuously with fluid pressure to the smaller side of the piston and at controlled intervals regulated by a valve to the other side of the piston so that the actuator is moved in one direction when hydraulic fluid is supplied to both sides of the cylinder and in the opposite direction when fluid pressure is supplied to only one side of the piston. The load member can be connected to or can be in the form of a spray nozzle of painting or cleaning equipment or can be a sliding gate or door.

These and other objects of the invention are accomplished by the embodiments disclosed in the following description and illustrated in the drawings in which.

Figure 1:
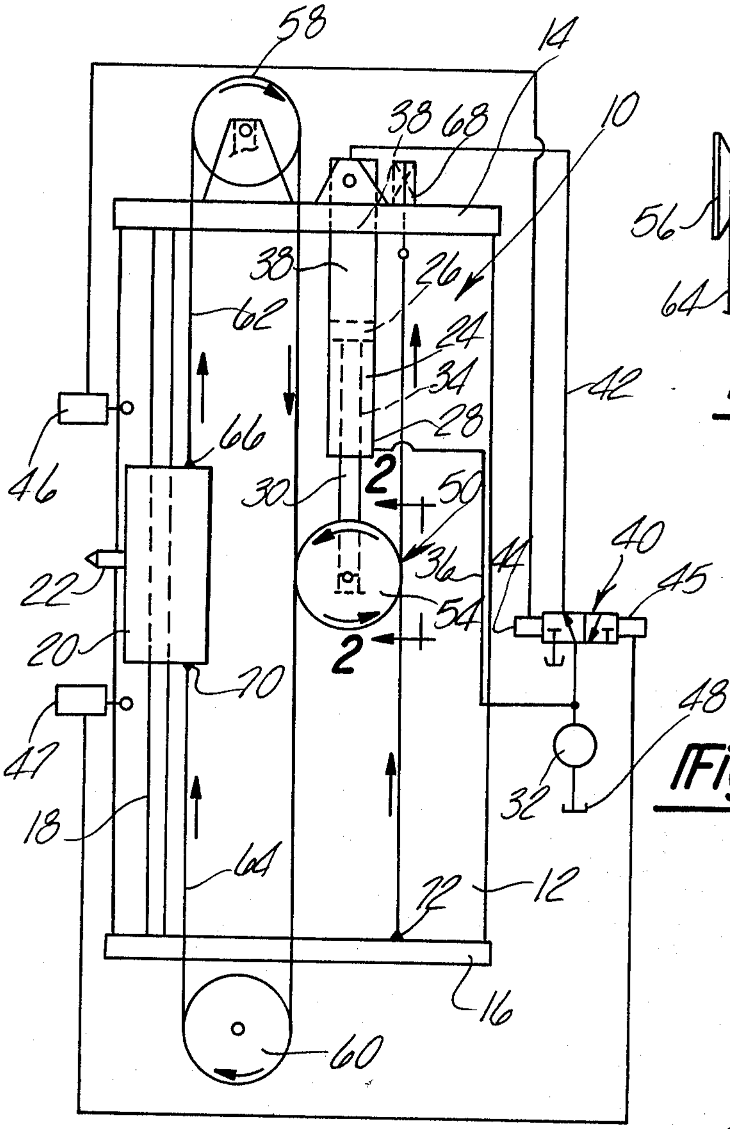
FIG. 1 is a diagrammatic view of load moving apparatus embodying the invention.

Referring to the drawings, a load moving apparatus which is particular adapted for reciprocating spray nozzles of the type used in painting or cleaning of articles moving on a traveling conveyor is designated generally at 10. The apparatus 10 includes a base member 12 which may take a variety of different forms and includes spaced apart support members 14 and 16 disposed at opposite ends of a guide member 18. The vertical guide member 18 is used to guide a load member 20 in a longitudinal path. The load member 20 may be used to support a spray nozzle 22 of painting equipment. The load 20 is reciprocated longitudinally of the guide member 18 by means of a double acting hydraulic actuator 24 having a piston 26 disposed in a cylinder 28 and having a piston rod 30 connected to one side of the piston 26.

The hydraulic actuator 24 is operated by hydraulic fluid supplied by pump 32, which can be of the adjustable volume type. Hydraulic fluid is supplied continuously through line 36 to a chamber 34 at the rod end of the hydraulic actuator 24. A chamber 38 at the opposite side of the piston 26 is connected to the pump 32 by way of a control valve 40 and a conduit 42 extending between the hydraulic actuator 24 and the pump 32.

The hydraulic actuator 24 is dimensioned so that the effective area of the piston 26 at the rod side of the hydraulic actuator 24 which is exposed to hydraulic fluid in chamber 34 is one half the effective area of the piston 26 exposed to hydraulic fluid in chamber 38. The hydraulic actuator 24 is operated by continuously supplying hydraulic fluid to the chamber 34 and intermittently to the chamber 38 under the control of the valve 40. In the absence of any hydraulic fluid in chamber 38, hydraulic pressure in the chamber 34 is effective to raise the piston 26 upwardly as viewed in FIG. 1. When hydraulic fluid is supplied through line 42 to the chamber 38 the hydraulic pressure in chamber 38 opposes the hydraulic pressure in chamber 34 because of the difference in effective areas of the piston 26 and forces the piston downwardly as viewed in FIG. 1. For any given pressure and volume the force and speed of movement of rod 30 will be equal in both directions.

The supply of hydraulic fluid to the chamber 38 of the hydraulic actuator 24 is under the control of valve 40 which is operated by valve actuators 44 and 45 connected, respectively, to control switches 46 and 47 disposed adjacent to the path of movement of the load 20. When the load 20 engages one or the other of the switches 46 and 47, the corresponding valve actuator 44 or 45 is operated to actuate the valve 40 and determine whether hydraulic fluid is delivered to the chamber 38 or is exhausted from the chamber 38 to a reservoir 48.

Figure 2:
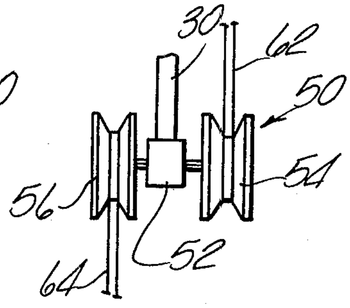
FIG. 2 is a view of a portion of the apparatus in FIG. 1, taken in the direction of line 2—2.

The end of the piston rod 30 supports a pulley assembly 50 which as seen in FIG. 2 includes a carriage member 52 and a pair of pulleys 54 and 56 supported for rotation on a common axis relative to the carriage member 52. The drive arrangement also includes a pair of pulleys 58 and 60 supported for rotation on support members 14 and 16, respectively. The load member 20 is connected to the hydraulic actuator 24 for movement by the latter by means of a pair of flexible members 62 and 64. One end of the flexible member 62 is connected to the load 20 at point 66 and is guided over stationarily located pulley 58 on support member 14 and over pulley 54 movably supported on the end of piston rod 30 and is fastened at its other end to a tension spring 68 on the support member 14 to maintain flexible members 62 and 64 taut. Similarly, the other flexible member or cable 64 is fastened to the load 20 at a point 70 and extends over the pulley 60 on the member 16 and the pulley 56 on the piston rod 30 and is fastened to a point 72 on the support member 16.

Figure 5:
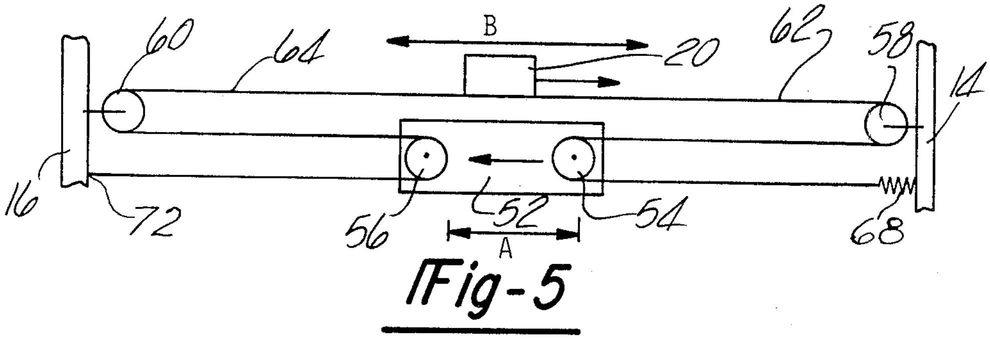
FIG. 5 is a diagrammatic view of a portion of the apparatus shown in FIG. 1 to clarify the arrangement of the parts.

When the hydraulic actuator 24 is operated so that the piston rod 30 moves downwardly the carriage member 52 and the pulleys 54 and 56 also are moved downwardly. This causes the cable 62 to pull the load 20 upwardly. At the same time the load 20 pulls the cable 64. Upon upward movement of the piston rod 30 the carriage member 52 with its pulleys 54, 56 is moved upwardly causing the cable 64 to pull the load 20 downwardly. Because of the pulley and cable arrangement, movement of the load 20 on the guide member 18 in a full cycle of operation is through a distance twice that of the distance of movement of the carriage member 52 on the piston rod 30. This is best seen in FIG. 5 which diagramatically shows the pulley and cable arrangement of the FIG. 1 structure wherein the dimension A depicts the stroke of the hydraulic actuator 24 and the dimension B depicts the corresponding distance of movement of the load member 20. The carriage member travels through the distance A at the same time that the load 20 is traveling the distance B. Consequently, the load 20 moves at a rate and through a distance which is twice as fast as the rate of movement and twice the distance of movement of the piston 30 through the distance A.

The control switches 46 and 47 can be located at opposite ends of the path B or if a shorter path of movement is desired for the load 20, the switches 46 and 47 can be located closed together to utilize only a portion of the path B or stroke of the hydraulic actuator 24.

The embodiment of the invention seen in FIGS. 1, 2 and 5 is particularly useful for moving a spray nozzle 22 of spray paint appratus which is not shown. The arrangement serves to move the spray nozzle twice as fast as the hydraulic actuator 24 is moved. The speed of the hydraulic actuator is determined by the volume control on the adjustable volume pump 32. It should be understood that cables and pulleys are preferred but that the flexible member can be a chain and that sprockets can be substituted for the pulleys.

Figure 3:
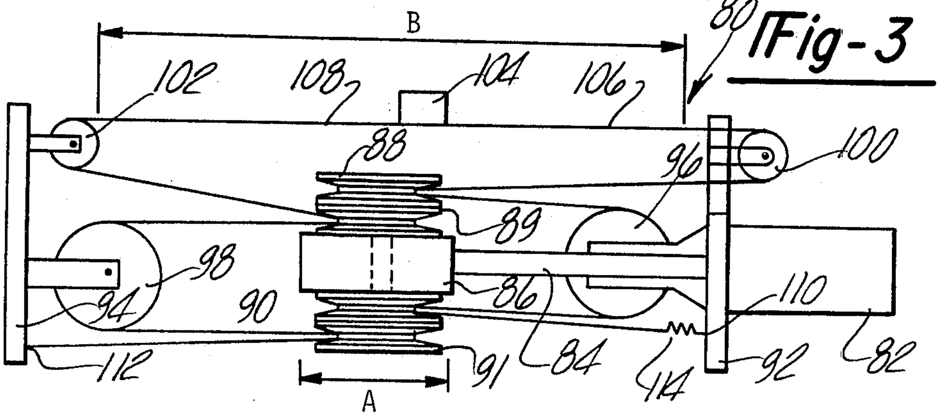
FIG. 3 is a diagrammatic view of another embodiment of the invention.

Referring now to FIG. 3, another embodiment of the invention is shown which is particularly adapted for opening and closing sliding gates. The load moving apparatus is designated generally at 80 and includes a hydraulic actuator 82 which is of the same general construction as the hydraulic actuator 24 seen in FIG. 1. In this particular instance the actuator 82 is illustrated with an elongated piston rod 84 to prevent obscuring the remainder of the mechanism. It will be understood, however, that the piston rod 84 can be made shorter to make the equipment even more compact. The end of the piston rod 84 is provided with a carriage member 86 which supports two pairs of pulleys, 88, 89, 90 and 91. The pulleys are supported for rotation on a common axis extending transversely to the axis of the piston rod 84. Support members 92 and 94 are maintained in fixed spaced apart relationship. A pair of pulleys 96 and 98 are rotatably supported on the support members 92 and 94 respectively. Another pair of pulleys 100 and 102 also can be rotatably supported on the support members 92 and 94 in fixed spaced apart relationship.

A load member is designated at 104 and can take many forms such as a sliding gate or the like. The load member 104 moves in a linear path between the pulleys 100 and 102 and has a pair of flexible members or cables 106 and 108 extending in opposite directions therefrom. The cable 106 passes over pulley 100 on the support member 92, the pulley 88 on the carriage member 86, the pulley 96 on the support member 92, the pulley 90 on the carriage member 86 and back to the support member 92 where it is anchored at a point indicated at 110. Similarly, the cable 108 extends from the load member 104 over the pulley 102, the pulley 89, the pulley 98, the pulley 91 and has its other end anchored at 112.

Figure 6:
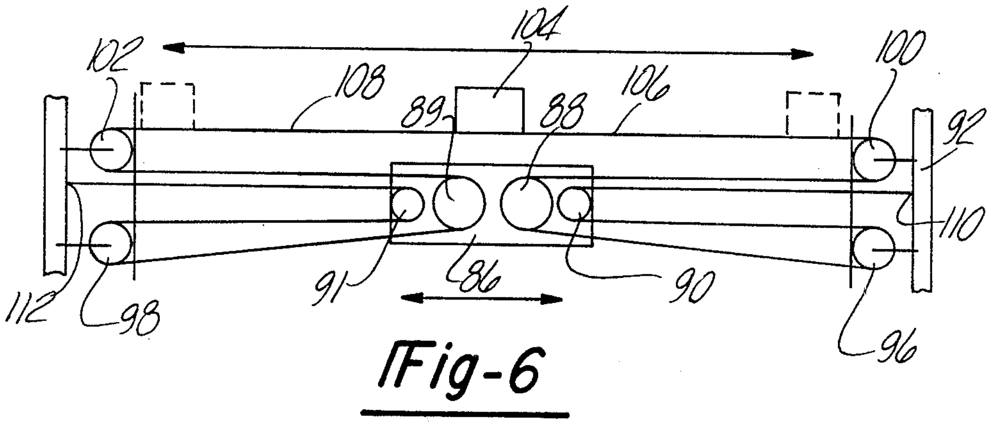
FIG. 6 is a diagrammatic view of a portion of the structure seen in FIG. 3 to clarify the arrangement of the parts.

As viewed in FIGS. 3 and 6, movement of the carriage member 86 to the left causes the cable 106 to pull the load member 104 to the right. Similarly, movement of the carriage member 86 to the right causes the cable 108 to pull the load 104 to the left.

The embodiment shown in FIG. 3 can be provided with the same hydraulic circuitry as associated with the hydraulic actuator 24 seen in FIG. 1 and the apparatus will operate in substantially the same manner as the prior embodiment except that when the carriage is moved through a distance indicated at A, the load member 104 moves through a distance B which is four times the distance A. Also the load member 104 will move at a rate of speed four times the rate of speed of the piston rod 84.

The embodiment in FIG. 3 is particularly adapted for gates and the like since, for example, when both sides of the piston in the cylinder 82 are vented to atmosphere, physical force can be applied to the gate member or load 104 to easily move the gate manually.

In both of the embodiments shown in FIGS. 1 and 3, spring tensioning members 68 and 114 are connected to one cable of each of the embodiments to maintain all of the flexible members 62, 64, 106 and 108 under tension.

The embodiment of the invention in FIG. 1 permits movement of load at twice the distance and speed of the movement of the carriage member and the embodiment in FIG. 3 permits movement at a speed and distance at a ratio of four to one.

Figure 4:
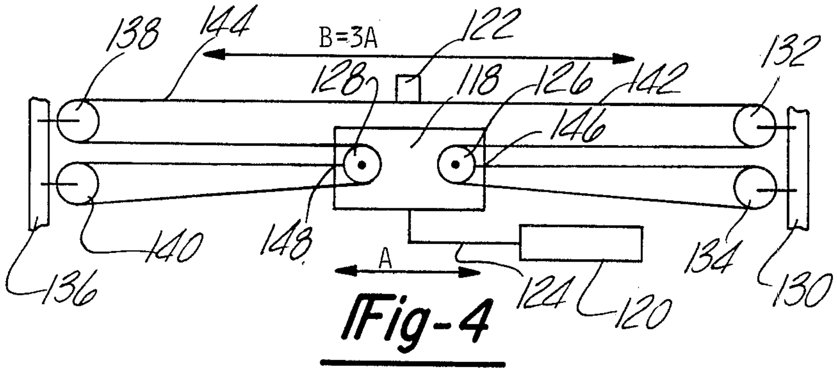
FIG. 4 is a diagrammatic view of still another embodiment of the invention.

Referring now to FIG. 4, another embodiment of the invention is illustrated diagrammatically in which the movement of a carriage member 118 by a hydraulic actuator 120 is effective to move a load member 122 in a ratio of three to one. In other words, the speed and distance of movement of the load 122 is three times the speed and distance of movement of the piston rod 124 of the hydraulic actuator 120. In this embodiment, the carriage member 118 is provided with pulleys 126 and 128. A support member 130 is provided with pulleys 132 and 134 and support member 136 is provided with pulleys 138 and 140. A pair of flexible members or cables 142 and 144 extend in opposite directions from the load member 122. The cable 144 is guided over the pulley 132, pulley 126, pulley 134 and has its other end anchored at 146 on the carriage 118. Similarly, the cable 144 extends in the opposite direction from the load member 122 over the pulley 138, pulley 128, pulley 140 and has its end anchored on carriage 118 at a point indicated at 148.

In all three embodiments of the invention, movement of the carriage member in a path of a predetermined length results in movement of a load member in a path which is a multiple of the path of the carriage member.

A load moving apparatus has been provided, wherein a load can be moved in a predetermined path by means of a fluid operated actuator moving a carriage member in a second path. By an arrangement of pulleys and cables or the like, mounted on the carriage member and on supports at opposite ends of the predetermined path, the load is moved a distance and also at a speed which is a multiple of the distance and speed of movement through which the fluid operated actuator moves the carriage. Various arrangements of pulleys make it possible to move the load two or more times the distance that the carriage members moves, depending on the arrangement of pulleys.

I claim:

1. A load moving apparatus comprising; a support member, a carriage member supported relative to said support member for reciprocating movement in a first predetermined path, a load device supported relative to said support member for reciprocating movement in a second predetermined path, a pair of first pulleys supported on said carriage member for movement therewith and rotation relative thereto, a pair of second pulleys mounted on said support member at opposite ends of said first predetermined path and being spaced apart a distance of least twice the distance of said second predetermined path, a pair of flexible elements each having one end fixed to one of said members and the other end fixed to said load device, said flexible members each being guided over a pulley of said first pair and a pulley of said second pair of pulleys, one flexible element of said pair of flexible elements being operative to move said load device in one direction and the other of said pair of flexible elements being operative to move said load device in the other direction upon movement of said carriage member, a fluid operated actuator having a piston, a rod extending from one side of said piston and having its end connected to said carriage member, said actuator having an overall length in its extended position which is less than the spacing of said pair of second pulleys, said actuator being supported relative to said support member and being operative to move said load device at a speed and through a distance at least twice the speed and distance of movement of said carriage member.

2. The combination of claim 1, wherein said one end of each of said pair of flexible elements is connected to said support member.

3. The combination of claim 1 wherein each of said pair of flexible elements is guided over at least two pulleys.

4. The combination of claim 1 and further comprising an additional pair of pulleys supported on said carriage member for movement therewith and rotation relative thereto, said pair of flexible elements each being trained over said additional pair of pulleys.

5. The combination of claim 1, wherein said predetermined paths are disposed in parallel spaced relationship to each other.

6. The combination of claim 1, wherein said piston has an effective area at one side which is one-half the effective area of the opposite side of said piston, and a source of fluid pressure communicated continuously to said one side of said piston and intermittently to said other side of said piston for movement of said rod and said load device at equal speeds in opposite directions.

7. The combination of claim 1 and further comprising control means at opposite ends of said second predetermined path actuated by engagement with said load, said control means at one end of said predetermined path being operative to deliver fluid pressure to said other side of said cylinder and said control means at the other end of said predetermined path being operative to exhaust fluid from said other side of said piston.

8. The combination of claim 1, and further comprising resilent tension means associated with one of said flexible elements for maintaining said pair of flexible elements taut on said pulleys.

9. The combination of claim 1 and further comprising a source of fluid pressure communicating with said actuator, and means for varying the rate of delivery of fluid pressure to said actuator.

10. The combination of claim 1 wherein an additional pair of first pulleys is mounted on said carriage member and an additional pair of second pulleys is mounted on said support member, said pair of flexible elements each having said one end fixed to said support member and being guided over a pulley of each pair of pulleys for movement of said load device at a speed and through a distance at least four times the speed and distance of movement of said carriage member.

11. The combination of claim 10, wherein said pairs of first pulleys supported on said carriage member are disposed on a common axis for rotation independently of each other.

12. The combination of claim 11, wherein said axis is disposed transversely to said rod.

* * * * *